United States Patent
Lin et al.

(10) Patent No.: US 11,042,080 B2
(45) Date of Patent: Jun. 22, 2021

(54) LIGHT SOURCE MODULE AND PROJECTOR USING THE SAME

(71) Applicant: Qisda Corporation, Taoyuan (TW)

(72) Inventors: Wen-Yao Lin, Taoyuan (TW);
Tsung-Hsun Wu, Taoyuan (TW);
Ching-Shuai Huang, Gueishan Township (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/912,472

(22) Filed: Jun. 25, 2020

(65) Prior Publication Data
US 2020/0409249 A1 Dec. 31, 2020

(30) Foreign Application Priority Data
Jun. 27, 2019 (CN) .......................... 201910566267.X

(51) Int. Cl.
*G03B 21/20* (2006.01)
*G02B 27/14* (2006.01)

(52) U.S. Cl.
CPC ......... *G03B 21/204* (2013.01); *G02B 27/141* (2013.01); *G03B 21/2013* (2013.01); *G03B 21/2066* (2013.01)

(58) Field of Classification Search
CPC .............. G03B 21/204; G03B 21/2013; G03B 21/2066; G03B 21/2033; G03B 21/006; G03B 21/008; G03B 21/16; G03B 21/208; G02B 27/141; F21V 9/30; F21V 9/38; F21V 9/40; F21V 13/02; F21V 13/08; F21V 13/12; F21V 13/14
See application file for complete search history.

(56) References Cited

U.S. PATENT DOCUMENTS

| | | | | |
|---|---|---|---|---|
| 8,469,520 | B2 * | 6/2013 | Maeda | G03B 33/06 353/31 |
| 2017/0156577 | A1 * | 6/2017 | Machida | G02B 23/2469 |
| 2017/0332056 | A1 * | 11/2017 | Ando | H04N 9/3111 |
| 2018/0295682 | A1 * | 10/2018 | Machida | G02B 23/26 |
| 2019/0252578 | A1 * | 8/2019 | Zhai | H01L 33/505 |

* cited by examiner

*Primary Examiner* — Bao Q Truong

(57) ABSTRACT

A light source module includes first to third light sources respectively providing first, second and third lights, first and second wavelength conversion layers, first and second auxiliary light sources respectively providing first and second auxiliary lights, and a dichroic member. The first wavelength conversion layer is excited by the first light and the first auxiliary light from different sides to generate a first conversion light. The second wavelength conversion layer is excited by the second light and the second auxiliary light from different sides to generate a second conversion light. The dichroic member allows the first and second auxiliary lights to transmit therethrough and reflects the first and second conversion lights. The third light transmits through the dichroic member. The first and second conversion lights and the third light are different in wavelength ranges and combined to form an illumination light.

9 Claims, 3 Drawing Sheets

LIGHT SOURCE MODULE AND PROJECTOR USING THE SAME

BACKGROUND OF THE INVENTION

1. Field of the Invention

The invention generally relates to a light source module. Particularly, the invention relates to a light source module, which utilizes auxiliary light sources and wavelength conversion layers, and a projector having the same.

2. Description of the Prior Art

Projectors are widely used in various occasions, such as schools, exhibitions or conferences. With the evolution of technology and consumer demand, the development of projectors has been improved towards lighter weight or energy-saving. A major change comes from the change of the light source, which is improved from high-intensity discharge (HID) lamps to light-emitting diodes (LEDs). This improvement can significantly reduce volume and increase energy conversion efficiency.

However, the use of light-emitting diodes is accompanied by a problem of different efficiency of light-emitting elements of different colors. For example, the luminous efficiency of a blue LED will be better than that of a red LED or a green LED, resulting in the inability to improve the brightness of certain wavelength ranges, and the difficulty in integrating hardware or matching energy. In addition, when the intensity of a specific color light is increased, the combined white light is likely to have a color shift phenomenon, which seriously affects the displayed image quality. Therefore, how to improve the intensity of specific color lights without affecting the image quality has become one of the important issues in the development of light source modules or projectors.

SUMMARY OF THE INVENTION

It is an object of the invention to provide a light source module and a projector having the same, which utilizes the auxiliary light source and the wavelength conversion layer to improve the intensity of a corresponding color light, so as to improve the light efficiency of the light source module and minimize the color shift of the combined light.

In an embodiment, the invention provides a light source module for providing an illumination light, and the light source module includes a first light source configured to provide a first light, a first wavelength conversion layer having a first side and a second side, the first side disposed corresponding to the first light source, a second light source configured to provide a second light, a second wavelength conversion layer having a third side and a fourth side, the third side disposed corresponding to the second light source, a first auxiliary light source disposed corresponding to the first light source and configured to provide a first auxiliary light, the first wavelength conversion layer excited by the first light from the first side and by the first auxiliary light from the second side to generate a first conversion light, a second auxiliary light source disposed corresponding to the second light source and configured to provide a second auxiliary light, the second wavelength conversion layer excited by the second light from the third side and by the second auxiliary light from the fourth side to generate a second conversion light, a dichroic member having a fifth side and a six side, the fifth side disposed corresponding to the first auxiliary light source and the second auxiliary light source, and the six side disposed corresponding to the first wavelength conversion layer and the second wavelength conversion layer, the dichroic member configured to allow the first auxiliary light and the second auxiliary light to transmit therethrough and configured to reflect the first conversion light and the second conversion light, and a third light source configured to provide a third light transmitting through the dichroic member from the fifth side to the six side, wherein the first conversion light falls in a first wavelength range, the second conversion light falls in a second wavelength range different from the first wavelength range; the third light falls in a third wavelength range different from the first wavelength range and the second wavelength range, and the illumination light includes at least a portion of the first conversion light, at least a portion of the second conversion light, and at least a portion of the third light.

In another embodiment, the invention provides a light source module for providing an illumination light, and the light source module includes a first light source configured to provide a first light, a first wavelength conversion layer having a first side and a second side, the first side disposed corresponding to the first light source, a second light source configured to provide a second light, a second wavelength conversion layer having a third side and a fourth side, the third side disposed corresponding to the second light source, a first auxiliary light source disposed corresponding to the first light source and configured to provide a first auxiliary light, the first wavelength conversion layer excited by the first light from the first side and by the first auxiliary light from the second side to generate a first conversion light, a second auxiliary light source disposed corresponding to the second light source and configured to provide a second auxiliary light, the second wavelength conversion layer excited by the second light from the third side and by the second auxiliary light from the fourth side to generate a second conversion light, a first dichroic member disposed between the first auxiliary light source and the first wavelength conversion layer, the first auxiliary light transmitting through the first dichroic member to excite the first wavelength conversion layer, a second dichroic member disposed between the second auxiliary light source and the second wavelength conversion layer, the second auxiliary light transmitting through the second dichroic member to excite the second wavelength conversion layer, and a third light source configured to provide a third light transmitting through the first dichroic member and the second dichroic member, wherein the first conversion light falls in a first wavelength range; the second conversion light falls in a second wavelength range different from the first wavelength; the third light falls in a third wavelength range different from the first wavelength range and the second wavelength range, and the illumination light includes at least a portion of the first conversion light, at least a portion of the second conversion light, and at least a portion of the third light.

In an embodiment, the light source module further includes a light exit end, wherein the second dichroic member is disposed between the first dichroic member and the light exit end, and wherein the first conversion light is reflected from the first dichroic member and transmits through the second dichroic member to the light exit end, and the second conversion light is reflected from the second dichroic member to the light exit end to form the illumination light.

In an embodiment, the third light is substantially a blue light; the first conversion light is substantially a green light, and the second conversion light is substantially a red light or a yellow light.

In an embodiment, the first conversion light has a brightness greater than a brightness of the second conversion light, and the brightness of the second conversion light is greater than a brightness of the third light.

In another embodiment, the invention provides a projector including the light source module described above and a light-processing element configured to receive the illumination light to generate an image light, wherein the image light forms an image on a plane.

Compared with the prior art, the invention uses a plurality of auxiliary lights to irradiate a corresponding wavelength conversion layer to generate a conversion light of a desired color or wavelength, thereby making the combined illumination light not only increase the brightness but also adjust the color of the illumination light to enhance the image quality.

DETAILED DESCRIPTION OF THE PREFERRED EMBODIMENT

Figure 1:
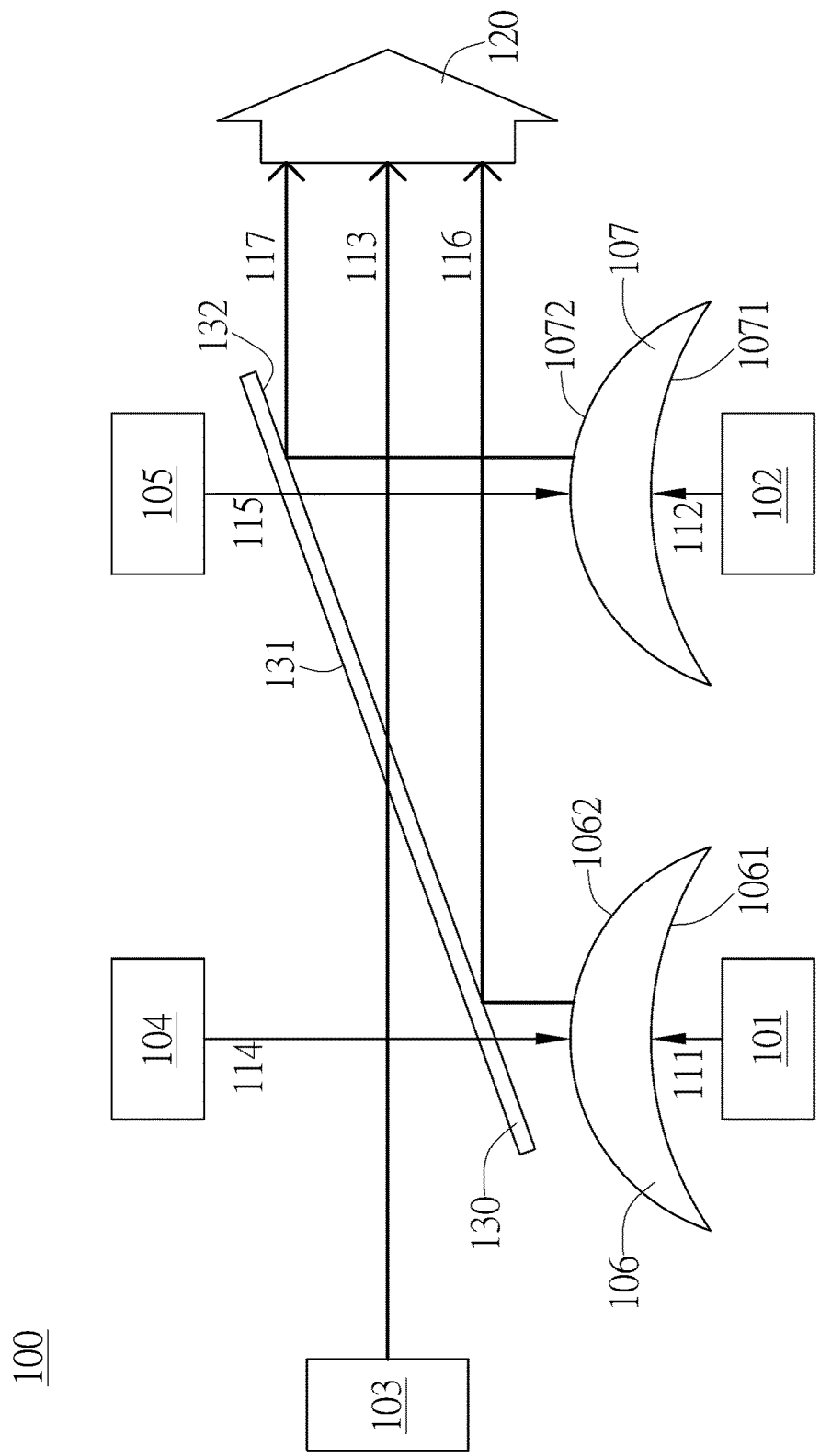
FIG. 1 is a schematic view of the light source module in an embodiment of the invention.

FIG. 1 is a schematic view of the light source module in an embodiment of the invention. As shown in FIG. 1, the light source module 100 is configured to provide an illumination light 120. The light source module 100 includes a first light source 101, a second light source 102, a third light source 103, a first wavelength conversion layer 106, a second wavelength conversion layer 107, a first auxiliary light source 104, a second auxiliary light source 105, and a dichroic member 130. The first light source 101 is configured to provide a first light 111. The second light source 102 is configured to provide a second light 112. The first wavelength conversion layer 106 has a first side 1061 and a second side 1062, and the first side 1061 is disposed corresponding to the first light source 101. The second wavelength conversion layer 107 has a third side 1071 and a fourth side 1072, and the third side 1071 is disposed corresponding to the second light source 102. The first auxiliary light source 104 is disposed corresponding to the first light source 101 and configured to provide a first auxiliary light 114. The first wavelength conversion layer 106 is excited by the first light 111 from the first side 1061 and by the first auxiliary light 114 from the second side 1062 to generate a first conversion light 116. The second auxiliary light source 105 is disposed corresponding to the second light source 102 and configured to provide a second auxiliary light 115. The second wavelength conversion layer 107 is excited by the second light 112 from the third side 1071 and by the second auxiliary light 115 from the fourth side 1072 to generate a second conversion light 117. The dichroic member 130 has a fifth side 131 and a six side 132. The fifth side 131 is disposed corresponding to the first auxiliary light source 104 and the second auxiliary light source 105, and the six side 132 is disposed corresponding to the first wavelength conversion layer 106 and the second wavelength conversion layer 107. The dichroic member 130 is configured to allow the first auxiliary light 114 and the second auxiliary light 115 to transmit therethrough and configured to reflect the first conversion light 116 and the second conversion light 117. The third light source 103 is configured to provide a third light 113, and the third light 113 transmits through the dichroic member 130 from the fifth side 131 to the six side 132. The first conversion light 116 falls in a first wavelength range. The second conversion light 117 falls in a second wavelength range different from the first wavelength range. The third light 113 falls in a third wavelength range different from the first wavelength range and the second wavelength range. The illumination light 120 includes at least a portion of the first conversion light 116, at least a portion of the second conversion light 117, and at least a portion of the third light 113.

Specifically, elements of the light source module 100 can be integrated with a suitable housing to form an integral modular configuration, which can be applied to various display devices and illumination devices. For example, the light source module 100 is preferably applied to a projector to function as an illumination light source of the projector, but not limited thereto. In other embodiments, according to design needs, the light source module 100 can be applied to any electronic devices, which require an illumination light source.

In an embodiment, the first light source 101, the second light source 102, the third light source 103, the first auxiliary light source 104, and the second auxiliary light source 105 can be light-emitting elements of high light-emitting efficiency and reduced volume, such as light-emitting diodes or laser diodes. Moreover, the color of light emitted from the first light source 101, the second light source 102, the third light source 103, the first auxiliary light source 104, or the second auxiliary light source 105 can be modified according to the wavelength conversion layer (e.g., 106, 107) and the dichroic member 130, so that the illumination light 120 formed by combining the first conversion light 116, the second conversion light 117, and the third light 113 can have a desired color. In an embodiment, the illumination light 120 is preferably a white light, but not limited thereto. For example, when the illumination light 120 is a white light, the first light source 101, the second light source 102, and the third light source 103 are preferably a green LED, a yellow LED, and a blue LED, respectively, so that first light 111, the second light 112, and the third light 113 are a green light, a yellow light, and a blue light, respectively. The first auxiliary light source 104 and the second auxiliary light source 105 respectively emit the first auxiliary light 114 and the second auxiliary light 115, which are configured to excite the first wavelength conversion layer 106 or the second wavelength conversion layer 107 to form the first conversion light 116 or the second conversion light 117. As such, the brightness and the intensity of a corresponding color light can be enhanced, and the illumination light 120 can have the desired brightness and chromaticity. Specifically, the first auxiliary light source 104 and the second auxiliary light source 105 can be modified according to, for example, the energy efficiency of the light source, the wavelength of the desired conversion light, the absorption wavelength range of the wavelength conversion layer. For example, the first auxiliary light source 104 and the second auxiliary light source 105 can be blue LEDs, so that the first auxiliary light 114 and the second auxiliary light 115 are blue lights.

The first light source 101 and the first auxiliary light source 104 are disposed corresponding to each other with the first wavelength conversion layer 106 interposed between the first light source 101 and the first auxiliary light source 104. For example, the first light source 101 and the first auxiliary light source 104 are preferably disposed in a manner that the light-emitting surface of the first light source 101 faces the light-emitting surface of the first auxiliary light source 104. The first wavelength conversion layer 106 is preferably disposed neighboring or closely adjacent to the first light source 101, so that the first side 1061 of first wavelength conversion layer 106 faces the first light source 101, and the second side 1062 of the first wavelength conversion layer 106 faces the first auxiliary light source 104. Similarly, the second light source 102 and the second auxiliary light source 105 are disposed corresponding to each other with the second wavelength conversion layer 107 interposed between the second light source 102 and the second auxiliary light source 105. For example, the second light source 102 and the second auxiliary light source 105 are preferably disposed in a manner that the light-emitting surface of the second light source 102 faces the light-emitting surface of the second auxiliary light source 105. The second wavelength conversion layer 107 is preferably disposed neighboring or closely adjacent to the second light source 102, so that the third side 1071 of second wavelength conversion layer 107 faces the second light source 102, and the fourth side 1072 of the second wavelength conversion layer 107 faces the second auxiliary light source 105. The third light source 103 is disposed at a position enabling the optical path of the third light 113 to overlap the optical paths of the first conversion light 116 and the second conversion light 117, so that the third light 113, the first conversion light 116, and the second conversion light 117 are at least partially combined to form the illumination light 120.

The first wavelength conversion layer 106 and the second wavelength conversion layer 107 can be a mono layer or a multi-layered structure and configured to absorb energy and emit light energy. The first wavelength conversion layer 106 and the second wavelength conversion layer 107 include materials, such as phosphor powders or quantum dots, which can directly or indirectly convert light energy when under excitation. According to the material of the wavelength conversion layer, the wavelength of light converted therefrom can be modified. For example, YAG (yttrium aluminium garnet) phosphor powders can generate light in a wavelength range of 550 nm to 560 nm. The wavelength conversion layer (e.g., 106, 107) can be modified according to, for example, the wavelength of the auxiliary light, the wavelength of a desired conversion light. For example, the first wavelength conversion layer 106 is preferably a film with green phosphor powders coated on the first side 1061 and the second side 1062, so that the first wavelength conversion layer 106 can generate the first conversion light 116 of green color when the first wavelength conversion layer 106 is excited by the first light 111 (e.g., green light) emitted from the first light source 101 and the first auxiliary light 114 (e.g., as blue light) emitted from the first auxiliary light source 104. Correspondingly, the second wavelength conversion layer 107 is preferably a film with red phosphor powders coated on the third side 1071 and the fourth side 1072, so that the second wavelength conversion layer 107 can generate the second conversion light 117 of red color when the second wavelength conversion layer 107 is excited by the second light 112 (e.g., yellow light) emitted from the second light source 102 and the second auxiliary light 115 (e.g., blue light) emitted from the second auxiliary light source 105. In other words, the wavelength of the first conversion light 116 is within in the wavelength range of green light, i.e., the first wavelength range is 476~570 nm; the wavelength of the second conversion light 117 is within in the wavelength range of red light, i.e., the second wavelength range is 570~750 nm; the wavelength of the third light 113 is within in the wavelength range of blue light, i.e., the third wavelength range is 380~476 nm.

The dichroic member 130 is an optical element, which allows lights of a specific wavelength range to transmit therethrough and reflects lights of another specific wavelength range. For example, the dichroic member 130 can be a dichroic mirror or a color filter, which has an optical coating on the light incident region according to required optical properties. In this embodiment, the dichroic member 130 preferably allows the third light 113, the first auxiliary light 114, and the second auxiliary light 115 to transmit therethrough and reflects the conversion light 116 and the second conversion light 117. For example, the dichroic member 130 can have a coating allowing the blue light to transmit therethrough and reflecting the green light on a region corresponding to the first conversion light 116 and a coating allowing the blue light to transmit therethrough and reflecting the red light on a region corresponding to the second conversion light 117. As such, the conversion light 116, the second conversion light 117, and the third light 113 can substantially emit toward a same direction to form the illumination light 120. In an embodiment, the dichroic member 130 is preferably disposed inclinedly with respect to the first light source 101 and the second light source 102 (or with respect to the first auxiliary light source 104 and the second auxiliary light source 105). The first wavelength conversion layer 106 is located between the dichroic member 130 and the first light source 101, and the second wavelength conversion layer 107 is located between the dichroic member 130 and the second light source 102. For example, the first light source 101 and the second light source 102 are disposed adjacent to each other on a same side, such as the six side 132, with respect to the dichroic member 130, so that the distance between the first light source 101 and the dichroic member 130 is smaller than the distance between the second light source 102 and the dichroic member 130. The first auxiliary light source 104 and the second auxiliary light source 105 are disposed adjacent to each other on a same side, such as the fifth side 131, with respect to the dichroic member 130, so that the distance between the first auxiliary light source 104 and the dichroic member 130 is greater than the distance between the second auxiliary light source 105 and the dichroic member 130.

In this embodiment, projections of the first light source 101 and the first auxiliary light source 104 on the dichroic member 130 are preferably overlapped with each other, and projections of the second light source 102 and the second auxiliary light source 105 on the dichroic member 130 are preferably overlapped with each other. The third light source 103 is preferably located outside of the projection areas of the first light source 101, the first auxiliary light source 104, the second light source 102, and the second auxiliary light source 105 on the dichroic member 130. For example, the third light source 103 is located at a side of the first light source 101 and the first auxiliary light source 104, so that the third light 113 can transmit through the dichroic member 130 from fifth side 131 to the six side 132.

Referring to FIG. 1, the optical path of the light source module 100 for providing a white illumination light will be described. As shown in FIG. 1, the first light 111 (e.g., green light) provided by the first light source 101 is incident to the first side 1061 of the first wavelength conversion layer 106, and the first auxiliary light 114 (e.g., blue light) provided by the first auxiliary light source 104 transmits through the dichroic member 130 from the fifth side 131 to the six side 132 and is incident to the second side 1062 of the first wavelength conversion layer 106, so that the first wavelength conversion layer 106 is excited by the first light 111 (e.g., green light) and the first auxiliary light 114 (e.g., blue light) to generate the first conversion light 116, such as green light. The first conversion light 116 is incident to the dichroic member 130 from the six side 132 and is then reflected from the dichroic member 130 to a predetermined direction, such as righthand side. The second light 112 (e.g., yellow light) provided by the second light source 102 is incident to the third side 1071 of the second wavelength conversion layer 107, and the second auxiliary light 115 (e.g., blue light) provided by the second auxiliary light source 105 transmits through the dichroic member 130 from the fifth side 131 to the six side 132 and is incident to the second side 1072 of the second wavelength conversion layer 107, so that the second wavelength conversion layer 107 is excited by the second light 112 (e.g., yellow light) and the second auxiliary light 115 (e.g., blue light) to generate the second conversion light 117, such as red light or yellow light. The second conversion light 117 is incident to the dichroic member 130 from the six side 132 and is then reflected from the dichroic member 130 to the same predetermined direction, such as righthand side. The third light 113 (e.g., blue light) provided by the third light source 103 transmits through the dichroic member 130 from the fifth side 131 to the six side 132 and travels along the same predetermined direction, such as righthand side, so that the first conversion light 116 and the second conversion light 117 reflected to the same direction and are combined with the third light 113, which travels along the same direction, to form the illumination light 120. As such, the intensity of red light and green light in the illumination light 120 can be promoted to enhance the generating efficiency and the chromacity of the illumination light 120, i.e., to improve the color shift phenomenon of the illumination light 120.

Figure 2:
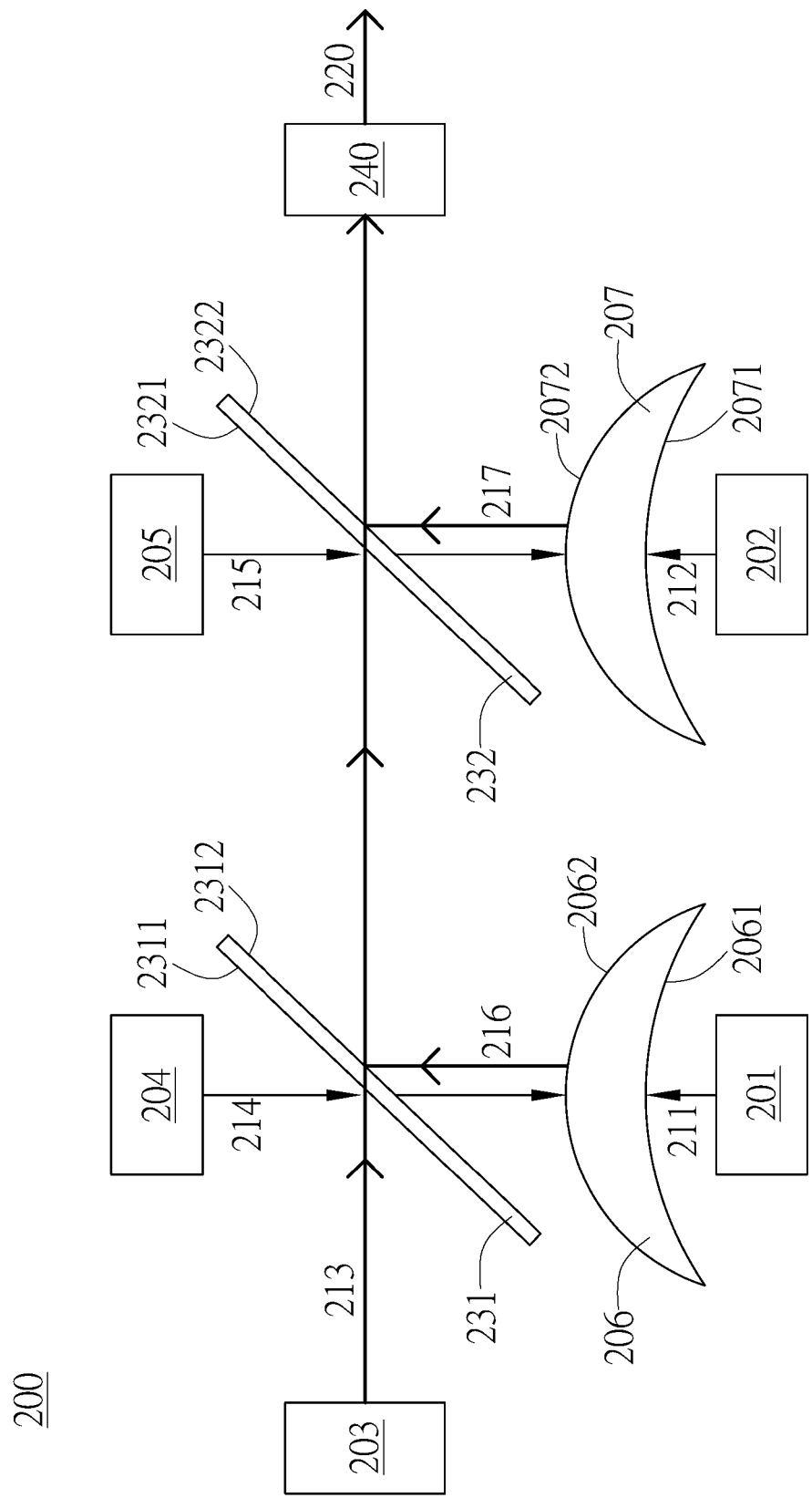
FIG. 2 is a schematic view of the light source module in another embodiment of the invention.

In the above embodiment, a single dichroic member 130 is employed to manipulate the optical paths of the first conversion light 116 and the second conversion light 117, but not limited thereto. In another embodiment, a plurality of dichroic members can be used, and the reflected directions of the first conversion light and the second conversion light can be more effectively controlled by manipulating the inclined angle of each of the plurality of dichroic members. As shown in FIG. 2, FIG. 2 is a schematic view of the light source module of another embodiment. In this embodiment, the light source module 200 is configured to provide an illumination light 220. The light source module 220 includes a first light source 201, a second light source 202, a third light source 203, a first auxiliary light source 204, a second auxiliary light source 205, a first wavelength conversion layer 206, a second wavelength conversion layer 207, a first dichroic member 231, and a second dichroic member 232. The first light source 201 is configured to provide a first light 211. The first wavelength conversion layer 206 has a first side 2061 and a second side 2062, and the first side 2061 is disposed corresponding to the first light source 201. The second light source 202 is configured to provide a second light 212. The second wavelength conversion layer 207 has a third side 2071 and a fourth side 2072, and the third side 2071 is disposed corresponding to the second light source 202. The first auxiliary light source 204 is disposed corresponding to the first light source 201 and configured to provide a first auxiliary light 214. The first wavelength conversion layer 206 is excited by the first light 211 from the first side 2061 and by the first auxiliary light 214 from the second side 2062 to generate a first conversion light 216. The second auxiliary light source 205 is disposed corresponding to the second light source 202 and configured to provide a second auxiliary light 215. The second wavelength conversion layer 207 is excited by the second light 212 from the third side 2071 and by the second auxiliary light 215 from the fourth side 2072 to generate a second conversion light 217. The first dichroic member 231 is disposed between the first auxiliary light source 204 and the first wavelength conversion layer 206, and the first auxiliary light 214 transmits through the first dichroic member 231 to excite the first wavelength conversion layer 206. The second dichroic member 232 is disposed between the second auxiliary light source 205 and the second wavelength conversion layer 207, and the second auxiliary light 215 transmits through the second dichroic member 232 to excite the second wavelength conversion layer 207. The third light source 203 is configured to provide a third light 213, and the third light 213 transmits through the first dichroic member 231 and the second dichroic member 232. The first conversion light 216 falls in a first wavelength range; the second conversion light 217 falls in a second wavelength range different from the first wavelength; the third light 213 falls in a third wavelength range different from the first wavelength range and the second wavelength range. The illumination light 220 includes at least a portion of the first conversion light 216, at least a portion of the second conversion light 217, and at least a portion of the third light 213.

It is noted that the embodiment of FIG. 2 is different from the embodiment of FIG. 1 in that two dichroic members, such as 231, 232, are utilized. Accordingly, the arrangement and detailed structure of the first light source 201, the second light source 202, the third light source 203, the first auxiliary light source 204, the second auxiliary light source 205, the first wavelength conversion layer 206, and the second wavelength conversion layer 207 can be referred to the descriptions of the foregoing embodiment and will not elaborate again. The arrangement of the first dichroic member 231 and the second dichroic member 232 and the optical path of the light source module 200 will be described hereinafter.

In this embodiment, each of the first dichroic member 231 and the second dichroic member 232 is disposed between the corresponding auxiliary light source (e.g., 204, 205) and the wavelength conversion layer (e.g., 206, 207) to manipulate the optical path and allows the third light 213 and the corresponding auxiliary light (e.g., 214, 215) to transmit therethrough. Specifically, the first dichroic member 231 is preferably disposed inclinedly between the first auxiliary light source 204 and the first wavelength conversion layer 206, so that projections of the first light source 201 and the first auxiliary light source 204 on the first dichroic member 231 are preferably overlapped with each other. The first auxiliary light source 204 is closer to the first side 2311 of the first dichroic member 231, and the first light source 201 is closer to the second side 2312 of the first dichroic member 231. Similarly, the second dichroic member 232 is preferably disposed inclinedly between the second auxiliary light source 205 and the second wavelength conversion layer 207, so that projections of the second light source 202 and the second auxiliary light source 205 on the second dichroic member 232 are preferably overlapped with each other. The second auxiliary light source 205 is closer to the first side 2321 of the second dichroic member 232, and the second light source 202 is closer to the second side 2322 of the second dichroic member 232. The third light source 203 is preferably located outside of the projection areas of the first light source 201 and the first auxiliary light source 204 on the first dichroic member 231 and outside of the projections of the second light source 202 and the second auxiliary light source 205 on the second dichroic member 232. For example, the third light source 203 is located at a side of the first light source 201 and the first auxiliary light source 204, so that the third light 213 can transmit through the first dichroic member 231 and the second dichroic member 232.

In an embodiment, the light source module 200 may further include a light exit end 240. The second dichroic member 232 is preferably disposed between the first dichroic member 231 and the light exit end 240, so that the first conversion light 216 is reflected from the first dichroic member 231 and transmits through the second dichroic member 232 to the light exit end 240, and the second conversion light 217 is reflected from the second dichroic member 232 to the light exit end 240 to form the illumination light 220. In an embodiment, the light exit end 240 can be an opening formed on the housing of the light source module 200, but not limited thereto. In another embodiment, the light exit end 240 can be a light-converging end (or component) of the light source module 200.

Referring to FIG. 2, the optical path of the light source module 200 for providing a white illumination light will be described. As shown in FIG. 2, the first light 211 provided by the first light source 201 is incident to the first side 2061 of the first wavelength conversion layer 206, and the first auxiliary light 214 provided by the first auxiliary light source 204 transmits through the first dichroic member 231 from the first side 2311 to the second side 2312 and is incident to the second side 2062 of the first wavelength conversion layer 206, so that the first wavelength conversion layer 206 is excited to generate the first conversion light 216. The first conversion light 216 is incident to the first dichroic member 231 from the second side 2312 and is then reflected from the first dichroic member 231 to transmit through the second dichroic member 232 from the first side 2321 to the second side 2322 and travels toward the light exit end 240. The second light 212 provided by the second light source 202 is incident to the third side 2071 of the second wavelength conversion layer 207, and the second auxiliary light 215 provided by the second auxiliary light source 205 transmits through the second dichroic member 232 from the first side 2321 to the second side 2322 and is incident to the fourth side 2072 of the second wavelength conversion layer 207, so that the second wavelength conversion layer 207 is excited to generate the second conversion light 217. The second conversion light 217 is incident to the second dichroic member 232 from the second side 2322 and is then reflected from the second dichroic member 232 to the light exit end 240. The third light 213 provided by the third light source 203 transmits through the first dichroic member 231 from the first side 2311 to the second side 2312 and then through the second dichroic member 232 from the first side 2321 to the second side 2322 and travels to the light exit end 240. In other words, the first conversion light 216 reflected from the first dichroic member 231 and transmitting through the second dichroic member 232 and the second conversion light 217 reflected from the second dichroic member 232 are combined with the third light 213 transmitting through the first dichroic member 231 and the second dichroic member 232 at the light exit end 240 to form the illumination light 220. As such, the intensity of red light and green light in the illumination light 220 can be promoted to enhance the generating efficiency and the chromacity of the illumination light 220, i.e., to improve the color shift phenomenon of the illumination light 220.

It is noted that the reflective property of the first dichroic member 231 and the second dichroic member 232 can be modified according to the color or wavelength of the conversion lights 216 and 217. The inclined angles of the first dichroic member 231 and the second dichroic member 232 can be modified according to the desired reflective angles of the conversion lights 216 and 217. For example, the angle between the normal line of the first dichroic member 231 (or the second dichroic member 232) and the light exit end 240 is preferably 45 degrees, and the incident angle of the conversion lights 216 and 217 is preferably 45 degrees, so that the first conversion light 216 and the second conversion light 217 can be converged at the light exit end 240.

In an embodiment, the third light 213 is substantially a blue light, the first conversion light 216 is substantially a green light, and the second conversion light 217 is substantially a red light or a yellow light. For example, the first conversion light 216 has a wavelength $\lambda_1$ (476 nm<$\lambda_1$≤570 nm); the second conversion light 217 has a wavelength $\lambda_2$ (570 nm<$\lambda_2$≤750 nm); the third light 213 has a wavelength $\lambda_3$ (380 nm<$\lambda_3$≤476 nm). Specifically, the first dichroic member 231 is preferably a dichroic mirror or a color filter, which allows the third light 213 and the first auxiliary light 214 to transmit therethrough and reflects the first conversion light 216. For example, the first dichroic member 231 can be a film with optical coatings, which allows the blue light to transmit therethrough and reflects the green light. The second dichroic member 232 is preferably a dichroic mirror or a color filter, which allows the third light 213, the second auxiliary light 215, and the first conversion light 216 to transmit therethrough and reflects the second conversion light 217. For example, the second dichroic member 232 can be a film with optical coatings, which allows the blue light and the green light to transmit therethrough and reflects the red or yellow light. In an embodiment, in response to the wavelength of the first conversion light 216, the first dichroic member 231 can be a filter having a corresponding transmittance (T), such as T50% @ ~485 nm, and in response to the wavelength of the second conversion light 217, the second dichroic member 232 can be a filter having a corresponding transmittance (T), such as T50% @ ~605 nm.

In this embodiment, the second light source 202 is preferably a light-emitting diode, which emits yellow or amber light. The second wavelength conversion layer 207 can be coated with materials, which can be excited to generate red light, such as red phosphor powders. The second auxiliary light 215 illuminates and excites the second wavelength conversion layer 207 to generate the red light, which is reflected or filtered by the second dichroic member 232, so that the brightness of the red light can be enhanced to promote the quality of the illumination light 220, such as promoting the brightness of the illumination light, reducing the color shift of the white light, or increasing the color light output (CLO).

In an embodiment, the first conversion light 216 has a brightness greater than a brightness of the second conversion light 217, and the brightness of the second conversion light 216 is greater than a brightness of the third light 213, but not limited thereto. According to practical applications, different brightness ratios can achieve different visual effects.

Figure 3:
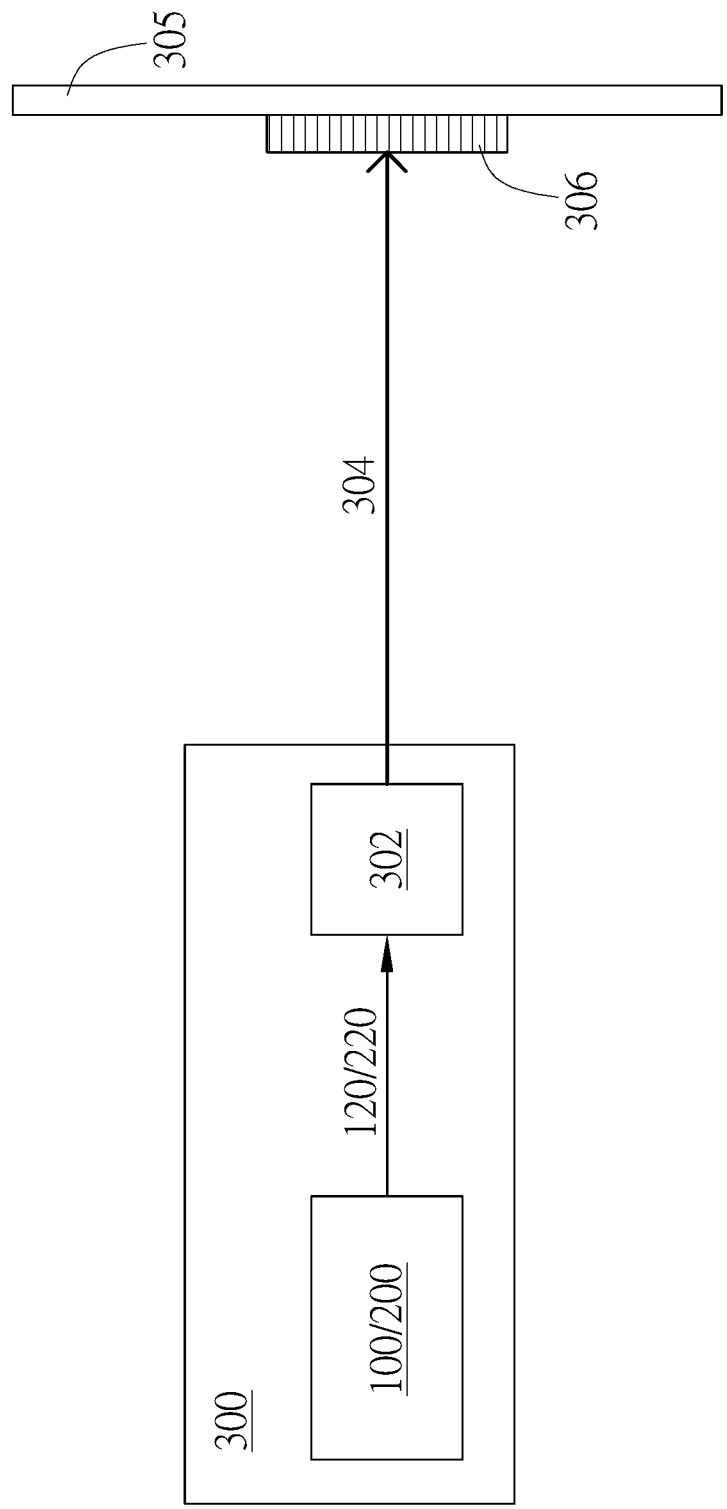
FIG. 3 is a schematic view of the projector in an embodiment of the invention.

FIG. 3 is a schematic view of the projector in an embodiment of the invention. As shown in FIG. 3, the projector 300 includes any of the light source modules 100 and 200 described above and a light-processing element 302. The light-processing element 302 is configured to receive the illumination light 120 or 220 to generate an image light 304. The image light 304 forms an image 306 on a plane 305.

In this embodiment, the light-processing element 302 can be a controllable light valve, such as a liquid crystal light valve or a digital micromirror device (DMD), which is configured to transfer the illumination light 120 or 220 to the image light 304 according to the image signal. The image light 304 is then projected on the plane 305, such as a screen or a wall, to form the image 306. It is noted that the projector 300 may include other suitable optical elements, such as one or more color wheels, lenses, mirrors, or condensers, to effectively form the image 306 on the plane 305.

Although the preferred embodiments of the present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. A light source module for providing an illumination light, comprising:
    a first light source configured to provide a first light;
    a first wavelength conversion layer having a first side and a second side, the first side disposed corresponding to the first light source;
    a second light source configured to provide a second light;
    a second wavelength conversion layer having a third side and a fourth side, the third side disposed corresponding to the second light source;
    a first auxiliary light source disposed corresponding to the first light source and configured to provide a first auxiliary light, the first wavelength conversion layer excited by the first light from the first side and by the first auxiliary light from the second side to generate a first conversion light;
    a second auxiliary light source disposed corresponding to the second light source and configured to provide a second auxiliary light, the second wavelength conversion layer excited by the second light from the third side and by the second auxiliary light from the fourth side to generate a second conversion light;
    a dichroic member having a fifth side and a six side, the fifth side disposed corresponding to the first auxiliary light source and the second auxiliary light source, and the six side disposed corresponding to the first wavelength conversion layer and the second wavelength conversion layer, the dichroic member configured to allow the first auxiliary light and the second auxiliary light to transmit therethrough and configured to reflect the first conversion light and the second conversion light; and
    a third light source configured to provide a third light transmitting through the dichroic member from the fifth side to the six side,
    wherein the first conversion light falls in a first wavelength range; the second conversion light falls in a second wavelength range different from the first wavelength range; the third light falls in a third wavelength range different from the first wavelength range and the second wavelength range, and the illumination light comprises at least a portion of the first conversion light, at least a portion of the second conversion light, and at least a portion of the third light.

2. A light source module for providing an illumination light, comprising:
    a first light source configured to provide a first light;
    a first wavelength conversion layer having a first side and a second side, the first side disposed corresponding to the first light source;
    a second light source configured to provide a second light;
    a second wavelength conversion layer having a third side and a fourth side, the third side disposed corresponding to the second light source;
    a first auxiliary light source disposed corresponding to the first light source and configured to provide a first auxiliary light, the first wavelength conversion layer excited by the first light from the first side and by the first auxiliary light from the second side to generate a first conversion light;
    a second auxiliary light source disposed corresponding to the second light source and configured to provide a second auxiliary light, the second wavelength conversion layer excited by the second light from the third side and by the second auxiliary light from the fourth side to generate a second conversion light;
    a first dichroic member disposed between the first auxiliary light source and the first wavelength conversion layer, the first auxiliary light transmitting through the first dichroic member to excite the first wavelength conversion layer;
    a second dichroic member disposed between the second auxiliary light source and the second wavelength conversion layer, the second auxiliary light transmitting through the second dichroic member to excite the second wavelength conversion layer; and
    a third light source configured to provide a third light transmitting through the first dichroic member and the second dichroic member,
    wherein the first conversion light falls in a first wavelength range; the second conversion light falls in a second wavelength range different from the first wavelength; the third light falls in a third wavelength range different from the first wavelength range and the second wavelength range, and the illumination light comprises at least a portion of the first conversion light, at least a portion of the second conversion light, and at least a portion of the third light.

3. The light source module of claim 2, further comprising:
    a light exit end, the second dichroic member disposed between the first dichroic member and the light exit end,
    wherein the first conversion light is reflected from the first dichroic member and transmits through the second dichroic member to the light exit end, and the second conversion light is reflected from the second dichroic member to the light exit end to form the illumination light.

4. The light source module of claim 3, wherein the third light is substantially a blue light; the first conversion light is substantially a green light, and the second conversion light is substantially a red light or a yellow light.

5. The light source module of claim 3, wherein the first conversion light has a brightness greater than a brightness of the second conversion light, and the brightness of the second conversion light is greater than a brightness of the third light.

6. A projector, comprising:
    a light source module configured to provide an illumination light; and a light-processing element configured to receive the illumination light to generate an image light, the image light forming an image on a plane, the light source module comprising:
- a first light source configured to provide a first light;
- a first wavelength conversion layer having a first side and a second side, the first side disposed corresponding to the first light source;
- a second light source configured to provide a second light;
- a second wavelength conversion layer having a third side and a fourth side, the third side disposed corresponding to the second light source;
- a first auxiliary light source disposed corresponding to the first light source and configured to provide a first auxiliary light, the first wavelength conversion layer excited by the first light from the first side and by the first auxiliary light from the second side to generate a first conversion light;
- a second auxiliary light source disposed corresponding to the second light source and configured to provide a second auxiliary light, the second wavelength conversion layer excited by the second light from the third side and by the second auxiliary light from the fourth side to generate a second conversion light;
- a first dichroic member disposed between the first auxiliary light source and the first wavelength conversion layer, the first auxiliary light transmitting through the first dichroic member to excite the first wavelength conversion layer;
- a second dichroic member disposed between the second auxiliary light source and the second wavelength conversion layer, the second auxiliary light transmitting through the second dichroic member to excite the second wavelength conversion layer; and
- a third light source configured to provide a third light transmitting through the first dichroic member and the second dichroic member, wherein the first conversion light falls in a first wavelength range; the second conversion light falls in a second wavelength range different from the first wavelength; the third light falls in a third wavelength range different from the first wavelength range and the second wavelength range, and the illumination light comprises at least a portion of the first conversion light, at least a portion of the second conversion light, and at least a portion of the third light.

7. The projector of claim 6, further comprising:
a light exit end, the second dichroic member disposed between the first dichroic member and the light exit end,
wherein the first conversion light is reflected from the first dichroic member and transmits through the second dichroic member to the light exit end, and the second conversion light is reflected from the second dichroic member to the light exit end to form the illumination light.

8. The projector of claim 7, wherein the third light is substantially a blue light; the first conversion light is substantially a green light, and the second conversion light is substantially a red light or a yellow light.

9. The projector of claim 7, wherein the first conversion light has a brightness greater than a brightness of the second conversion light, and the brightness of the second conversion light is greater than a brightness of the third light.

* * * * *